Sept. 5, 1967 M. BILLINGS 3,339,229
PLASTIC BOTTLE BLOWING AND REAMING APPARATUS
Filed Dec. 9, 1964 2 Sheets-Sheet 1
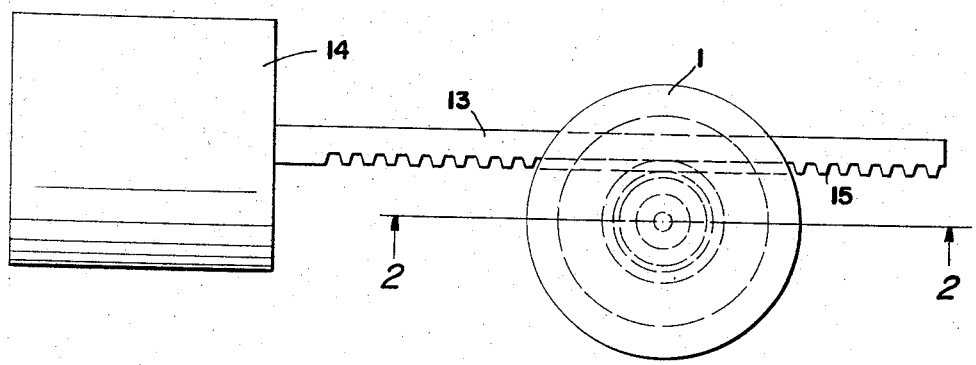
Fig. 1
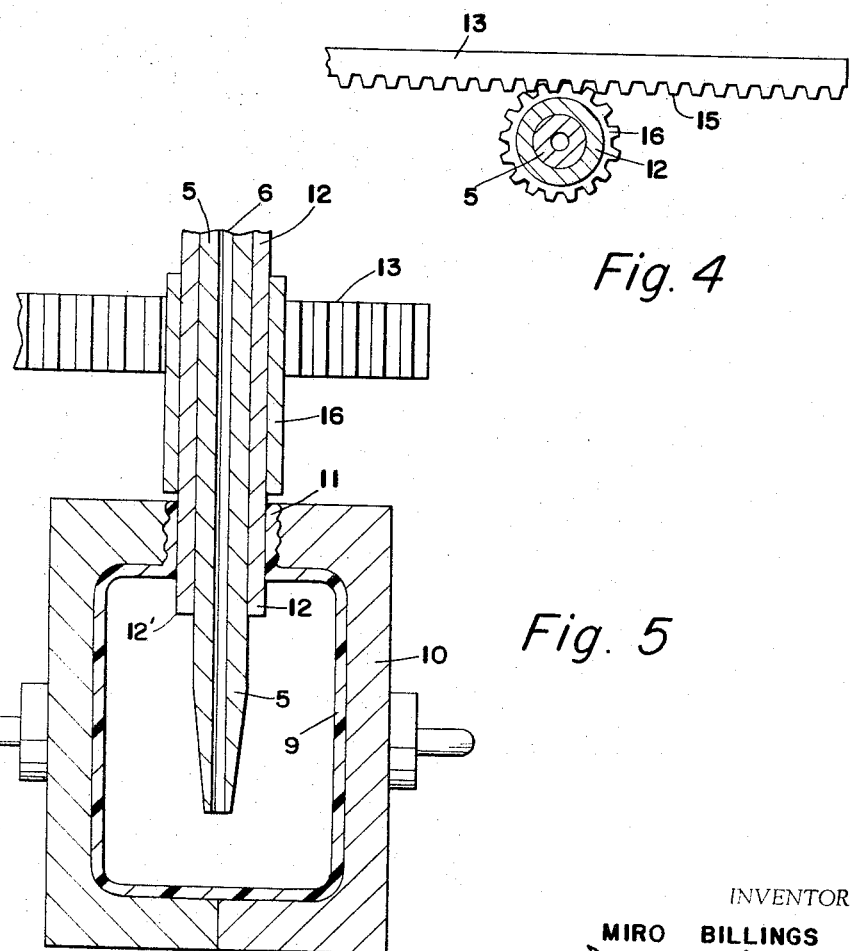
Fig. 4
Fig. 5
INVENTOR.
MIRO BILLINGS
BY
ATTORNEYS

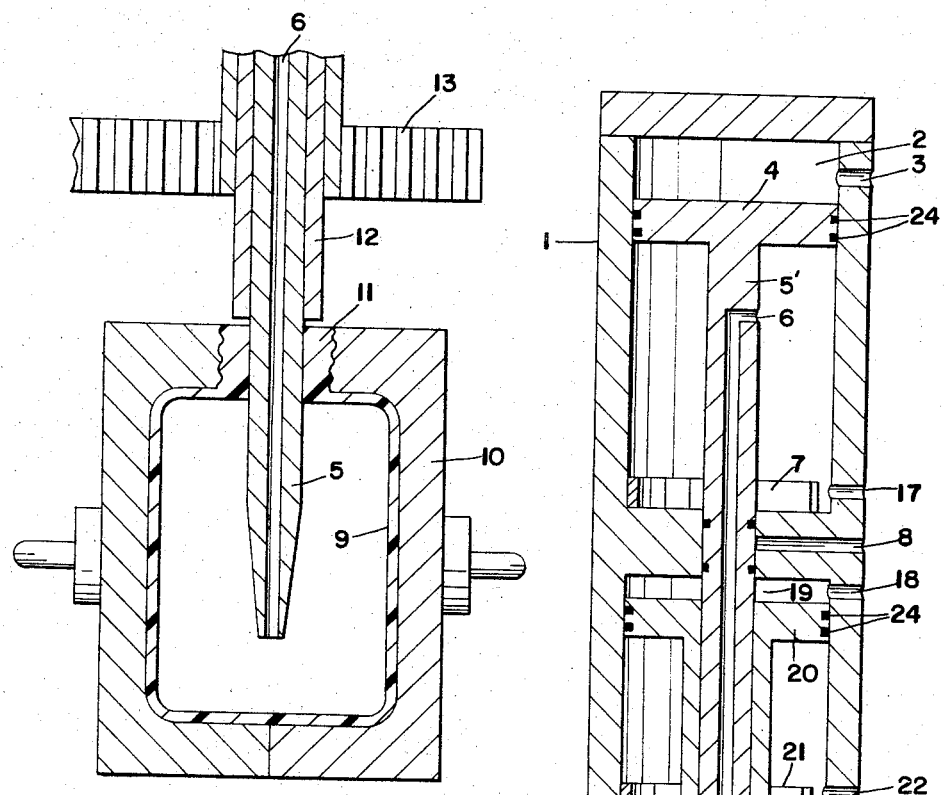
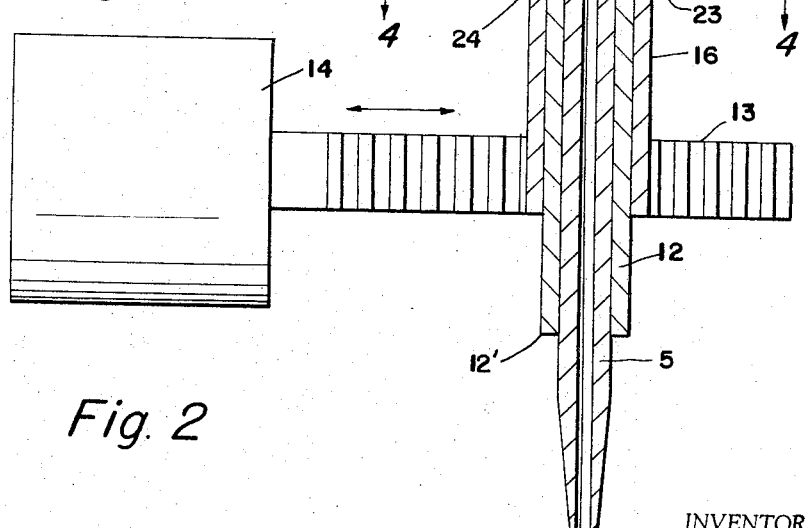

United States Patent Office 3,339,229
Patented Sept. 5, 1967

3,339,229
PLASTIC BOTTLE BLOWING AND REAMING APPARATUS
Miro Billings, Ramsey, N.J., assignor to The Dow Chemical Company, Midland, Mich., a corporation of Delaware
Filed Dec. 9, 1964, Ser. No. 417,155
2 Claims. (Cl. 18—5)

ABSTRACT OF THE DISCLOSURE

This invention comprises an apparatus for reaming the inner surface of the neck of a bottle in which the chief improvement involves the element consisting of a cylindrical sleeve having a common axis with the blow pin inserted into the blow mold, this cylindrical sleeve having a cutting edge on the outside cylindrical surface and being rotatable around its axis, and the apparatus also having a housing in which air chambers are provided to lower and raise both the blow pin and the reamer independently of each other, the reamer being adapted to rotate on its linear axis while being bored into the neck of the blown bottle and thereby reaming or cutting out the inside of the bottle neck.

---

This invention relates to apparatus for reaming the inner surface of the neck of a plastic bottle. More specifically, it relates to apparatus for reaming the inner surface of the neck of a plastic bottle formed by blow molding and reamed while the blow pin is still inside the bottle and the mold.

In present equipment for blow molding bottles, the inside of the neck of the bottle is generally reamed after the bottle has been removed from the mold. This necessitates an extra operation and handling which add to the manufacturing expense.

In the apparatus of this invention, it is possible to ream, or at least to initiate reaming, the inside of the neck of the bottle while the blow pin is still inserted in the bottle and while the bottle is still in the mold. This apparatus comprises a reaming means surrounding the blow pin and capable of being put in motion for reaming purposes while the blow pin is still in the newly formed bottle and the reaming operation can be performed prior to or simultaneously with withdrawal of the blow pin from the bottle.

The invention is best illustrated by reference to the drawings.

FIG. 1 is a top view of one modification of the blowing and reaming apparatus of this invention showing particularly the rack and pinion arrangement by which the reaming device is turned during the reaming operation.

FIG. 2 is a front cross-sectional view of the blowing and reaming device of this invention taken at line 2—2 of FIG. 1.

FIG. 3 is a partial elevational view showing a cross-section of the blow mold, the just-formed bottle and the blow pin in position within the bottle as the blowing operation is completed, with the reaming device in position to start the reaming operation.

FIG. 4 shows the rack and pinion arrangement with the pinion in cross-section taken at line 4—4 of FIG. 2.

FIG. 5 is a partial elevational, cross-sectional view of the mold, the pin positioned within the mold, and the reaming means after completion of the reaming operation.

This apparatus comprises housing 1 which encloses compressed air chamber 2 having an inlet opening 3 to which a source of compressed air is connected. In this air chamber 2 piston 4 is adapted to be moved downward by the pressure exerted by compressed air applied to its top surface. This piston is connected to and moves blow pin 5 downwardly as air pressure is admitted into opening 3.

In the upper region 5' of blow pin 5 there is an opening 6 which runs the length of the blow pin through and out the lower end thereof. When the compressed air admitted into air chamber 2 has forced piston 4 to its lowest position, so that the lower surface of piston 4 rests on ledge 7 in the lower portion of air compartment 2, the opening 6 is positioned directly opposite opening 8 which is also connected to a source of compressed air.

As compressed air is fed into opening 8 and into the interior of the blow pin, this performs the blow molding operation by expanding the parisan and pressing it against the interior of the mold. The parisan is not shown in its original form but FIGS. 3 and 5 show the formed bottle 9 pressed against the interior of blow mold 10 with the threads in neck 11 shaped at the top of the blow mold.

In FIG. 3 reamer 12 is positioned above the neck portion 11 of the bottle. Reamer 12 is rotated on its linear axis by the horizontal movement of rack 13 which is actuated by pneumatic cylinders (not shown) in cylinder housing 14. As rack 13 is moved horizontally, the teeth 15 of this rack engage the teeth in pinion 16 which is in fixed relationship with reamer 12, thereby rotating both the pinion and the reamer.

When the blow pin 5 is to be withdrawn from the bottle 9, either during or subsequent to the reaming operation, compressed air is fed into opening 17 so that air pressure is applied to the under surface of piston 4 and thereby causes piston 4 to rise upwardly thereby withdrawing blow pin 5 from bottle 9. Reamer 12 is lowered into cutting relationship with the bottle neck 11 by the admission of compressed air into opening 18 into air compartment 19. The air pressure exerted on the upper surface of piston 20 forces reamer 12 downwardly and as the reamer engages the interior of bottle neck 11, the horizontal movement of rack 13 causes rotation of reamer 12 simultaneously with the lowering operation of reamer 12. Piston 20 is stopped in its downward path by ledge 21. When reamer 12 is to be removed from the bottle neck, compressed air is admitted into opening 22 so that the air pressure applied to the lower surface of piston 20 forces the piston to move upwardly and with it withdraws reamer 12.

The cutting edge 12' of reamer 12 can be of various designs. It can be merely a sharp edge with the bottom surface flat as shown in the drawings or tapered upwardly toward the center of the reamer. The bottom of the reamer can also be saw-toothed if desired. Although the cuttings on each operation are small in quantity and therefore do not need any special provision for removal, the outer surface of the reamer can have a spiral groove as in an auger to allow upward passage of the cuttings during the reaming.

O rings 24 effect a sealing relationship between piston 4 and the inner wall of air compartment 2 and also between piston 20 and the inside of the side wall of air compartment 19. Ball bearings 23 in the lower end wall of the housing are for the purpose of facilitating rotation of the reamer in contact with rotatable sleeve 24.

Various timing devices and actuating means are used to time the various operations and to effect the various steps. For example, a timer in the line feeding compressed air into the interior of blow pin 5 can, upon a set time after air is applied to opening 6, effect the application of air pressure to opening 18 to set the reamer 12 into operation and simultaneously to actuate pneumatic cylinder 14 and thereby rack 13 with resultant rotation of reamer 12.

By another timer the application of compressed air into opening 17 can be effected at a preset time after the reamer 12 is actuated into reaming operation within the interior of bottle neck 11. While reamer 12 is in operation or just subsequent to its having completed the reaming operation, blow pin 5 can be withdrawn so that the air pressure still in bottle 9 will serve to remove the major portion if not substantially all of the cuttings from the reamer operation.

The apparatus of this invention can be used in bottom or top blow systems or systems where the parison is carried to the mold by the parison carrier, trapped and then blown.

The apparatus of this invention has the advantage of producing a bottle that requires no additional neck reaming or trimming and thus eliminates such a separate operation. Therefore, in the one operation of blow molding and simultaneous or immediately subsequent reaming, a completely trimmed bottle is produced.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. An apparatus for molding and reaming hollow plastic containers comprising:
   (a) a housing;
   (b) a first chamber contained in said housing;
   (c) a second chamber in said housing adjacent to said first chamber, and having its linear axis an extension of the linear axis of said first chamber;
   (d) a first piston positioned in said first chamber in slidable but close contact with the inner side walls of said first chamber;
   (e) a blow pin having one end connected to said first piston, and extending therefrom along the linear axis of said first chamber and also extending into and through said second chamber along the linear axis of said second chamber;
   (f) a second piston positioned in said second chamber in slidable but close contact with the inner sidewalls of said second chamber;
   (g) a reamer comprising a cylindrical sleeve attached to and extending from said second piston through and beyond said second chamber in the direction opposite from said first chamber, said cylindrical sleeve being concentric with and surrounding a portion of said blow pin, said cylindrical sleeve having an outer diameter corresponding in dimension to the desired diameter of the neck opening to be formed in said container and having a cutting edge at the external diameter of said cylindrical sleeve and at the end thereof opposite from the end joined to said second piston;
   (h) said first piston being adapted to move from a first position in said first chamber at a point removed from that end of said first chamber adjacent to the second chamber and to move along the linear axis of said first chamber through a substantial part of the length thereof to a second position in which said piston is closer to the end of said first chamber that is adjacent to said second chamber;
   (i) a first means for moving said first piston from said first position to said second position;
   (j) a second means for moving said first piston from said second position to said first position;
   (k) an opening in said blow pin extending through a substantial portion of the length thereof, and through the end of said blow pin opposite from that end joined to said first piston, said opening being positioned when said first piston is positioned in said second position to receive a supply of compressed air and thereby being adapted to expand a parison of heated plastic material into which said blow pin is inserted when said first piston is moved into said second position;
   (l) said second piston is adapted to be moved from a first position near the end of said second chamber adjacent to said first chamber to a second position closer to that end of said second chamber through which both said blow pin and said reamer extend;
   (m) a first means for moving said second piston from said first position to said second position;
   (n) a second means for moving said second piston from said second position to said first position;
   (o) a means for rotating said reamer on its linear axis simultaneously with the movement of said second piston from said first position to said second position and thereby linear movement of said reamer along its linear axis.

2. An apparatus for molding and reaming hollow plastic containers comprising:
   (a) a housing;
   (b) a first chamber contained in said housing having a first compressed air inlet in the upper region of said chamber and a second compressed air inlet in the lower region of said chamber;
   (c) a second chamber in said housing adjacent to said first chamber and having its linear axis an extension of the linear axis of said first chamber, and also having a first compressed air inlet in the upper region of said chamber and a second compressed air inlet in the lower region of said chamber;
   (d) a first piston in said first chamber in slidable but air-tight contact with the inner sidewalls of said first chamber;
   (e) a blow pin connected to said first piston and extending therefrom along the linear axis of said first chamber and also extending through and along the linear axis of said second chamber into and through said second chamber;
   (f) a second piston in said second chamber in slidable but air-sealing contact with the inner sidewalls of said second chamber;
   (g) a reamer comprising a cylindrical sleeve attached to and extending from said second piston and extending through and beyond said second chamber in the direction opposite from said first chamber, said cylindrical sleeve being concentric with and surrounding a portion of said blow pin in close but slidable contact with the outer surface of said blow pin, said cylindrical sleeve having an outer diameter corresponding in dimension to the desired diameter of the neck opening to be formed in said container and having a cutting edge at the external diameter of said cylindrical sleeve and at the end thereof opposite from the end joined to said second piston;
   (h) a pinion comprising an outer sleeve in fixed contact with the outer surface of a portion of said cylindrical reamer and having teeth on the outer surface thereof;
   (i) a rack having teeth on one side thereof adapted to engage the teeth of said pinion so that as said rack is transposed along its linear axis, the engaging teeth of said rack and said pinion cause the pinion to rotate and simultaneously rotate therewith the cylindrical reamer on its linear axis;
   (j) a means for transposing said rack from one position to another on its linear axis;
   (k) said first piston being adapated to be moved from a first position in said first chamber at a point removed from that end of said first chamber adjacent to the second chamber by the application of air pressure on the opposite side of said first piston from the side joined to said blow pin and adapted to move along the linear axis of said first chamber through a substantial part of the length thereof to a second position in which said piston is closer to the end of said first chamber that is adjacent to said second chamber;
(l) an opening in said blow pin extending through a substantial portion of the length thereof and through the end of said blow pin opposite from that end adjoined to said first piston, said opening being positioned when said first piston is positioned in said second position to receive in said blow pin opening a supply of compressed air and thereby adapted to expand a parisan of heated plastic material into which said blow pin is inserted when said first piston is moved into said second position;
(m) said first piston being adapted to be moved from said second position to said first position by the application of air pressure to the same side of said piston that is connected to said blow pin;
(n) said second piston being adpated to be moved from a first position near the end of said second chamber adjacent to said first chamber by the application of air pressure on the side of said piston opposite from that side connected to said reamer to a second position closer to that end of said second chamber through which both said blow pin and said reamer extend.
(o) said second piston being adapted to be moved from said second position to said first position by the application of air pressure on that side of said piston joined to said reamer;
(p) said reamer being adapted to be rotated on its linear axis simultaneously with linear movement of said reamer along its linear axis while said second piston is being transferred from said first position to said second position of said second piston.

References Cited

UNITED STATES PATENTS 2,984,865   5/1963   Mumford _____ 18—5 XR

J. SPENCER OVERHOLSER, *Primary Examiner.*

WILBUR L. McBAY, *Examiner.*